United States Patent Office 3,131,071
Patented Apr. 28, 1964

3,131,071
FIRE RETARDANT ORGANIC COATINGS
Don L. Hunter, Long Beach, Kiyoshi Kitasaki, Garden Grove, and George W. Willcockson, Anaheim, Calif., assignors to United States Borax & Chemical Corporation, Los Angeles, Calif., a corporation of Nevada
No Drawing. Filed Jan. 23, 1962, Ser. No. 168,280
5 Claims. (Cl. 106—15)

The present application is a continuation-in-part of application Serial No. 79,579, filed December 30, 1960, now abandoned, which in turn was a division of application Serial No. 858,311, filed December 9, 1959, now U.S. Patent No. 3,028,411.

This invention relates as indicated to fire retardant organic coatings and has particular reference to the use of the alkali metal salts of glycol monoborates as fire retardants in paints, lacquers and varnishes.

We have found that the alkali metal salts of glycol monoborates have unique solubilities and other properties which make them particularly desirable as additives in a number of organic media. The salts of the glycol monoborates when added to paints, varnishes and lacquers that have organic solvents as the vehicle increase the flame resistance of said paints, varnishes and lacquers. Additionally, the glycol monoborate salts when dissolved in an organic solvent can be used to impregnate wood and fiberboard and increase the flame resistance thereof. It is an object of this invention to provide compositions of paints, lacquers and varnishes with the alkali metal salts of glycol monoborates.

Other objects of the invention will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the many ways in which the principle of the invention may be employed.

The alkali metal salts of glycol monoborates useful in organic coating compositions can be prepared for example by reacting an alkali metal hydroxide with a di-glycol boric anhydride, said di-glycol boric anhydride having the general formula:

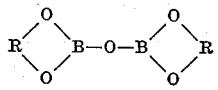

where R is an alkylene radical of 2 to 3 carbon atoms in length and having a total of from 2–10 carbon atoms.

While in the following example only di-(2-methylpentanediol-2,4)boric anhydride is used for illustrative purposes, it will be clearly understood that it is only necessary to merely substitute in its stead any of the other defined di-glycol boric anhydrides to achieve comparable results.

Thus, the following materials are typical examples of the 1,2- and 1,3-glycol boric anhydrides applicable to the present process:

Di-(propanediol-1,2)boric anhydride
Di-(butanediol-1,2)boric anhydride
Di-(butanediol-1,3)boric anhydride
Di-(2,2,4-trimethylpentanediol-1,3)boric anhydride
Di-(2,3,4-trimethylpentanediol-2,4)boric anhydride
Di-(pentanediol-2,3)boric anhydride
Di-(catechol)boric anhydride
Di-(2-methylpentanediol-2,4)boric anhydride As for the other reactant used in the present process, any of the alkali metal hydroxides, e.g., Na, Li, K, Cs, and Rb hydroxides are equally applicable.

It is of interest to note at this time that the alkaline earth metal hydroxides have been used to produce the metal glycol monoborates of the present invention. However, due to the fact that they are relatively insoluble in the reaction mixture, the reaction times were so extremely long and the yields so small as to make such process economically undesirable. Nevertheless, the fact remains that such reactions did occur.

I

Into a two-liter, three-necked, round-bottomed flask equipped with a paddle-type stirrer, a water condenser, and a pot thermometer, were added 270 grams of di-(2-methylpentadiol-2,4)boric anhydride and 500 mls. of methanol; 80 grams of sodium hydroxide was then added to the liquid mixture. When the initial exothermic reaction subsided, heat was applied and the reaction mixture was refluxed for about one-half hour. The methanol and water of reaction were stripped from the flask and the residue, sodium 2-methylpentanediol-2,4 monoborate, was then removed and vacuum dried for about 2 to 4 hours. Chemical analysis of the resultant sodium 2-methylpentanediol-2,4 monoborate revealed the following data:

Na=13.76% (theory 13.86%)
B=6.44% (theory 6.52%)

Essentially the same procedure was followed in experiments using the other alkali metal hydroxides. Using lithium hydroxide, the final product of the reaction was lithium 2-methylpentanediol-2,4 monoborate whose chemical analysis revealed the following data:

Li=4.61% (theory 4.68%)
B=7.12% (theory 7.22%)

Using potassium hydroxide, the final product was potassium 2-methylpentanediol-2,4 monoborate whose chemical analysis revealed the following data:

K=21.18% (theory 21.47%)
B=5.85% (theory 5.94%)

It will also be noted that substantially identical results were obtained with the other di-glycol boric anhydrides previously enumerated. It is generally accepted by those skilled in the art that metal salts of organic compounds are substantially insoluble in organic solvents. The present alkali metal glycol monoborates, however, show remarkable solubilities in many organic solvents. For example, when sodium 2-methylpentanediol-2,4 monoborate is added in amounts of from about 0.5 to about 10% to oil base paints, lacquers and varnishes, which contain common commercial solvents, the sodium 2-methylpentanediol-2,4 monoborate dissolves in the solvents and imparts the property of flame resistance to the various paints, lacquers and varnishes. Sodium 2-methylpentanediol-2,4 monoborate when dissolved in an organic solvent such as hexane in amounts from about 0.2 to about 10% can be used to impregnate wood and fiberboard for increased fire retardance.

The alkali metal glycol monoborates can be incorporated in any of the paints, varnishes, lacquers, etc., that use oil and organic solvent vehicles. It is well known that there are innumerable formulations for various purpose paints, varnishes and lacquers; however, it must be clearly understood that the present monoborates can be added to any paint, varnish or lacquer which uses oil and organic solvent vehicles and will impart flame resistance thereto. The following formulations are given only for illustrative purposes and represent typical formulations in which the present alkali metal glycol monoborates can be incorporated:

(1) Oil Base Paint

| | | |
|---|---|---|
| White lead—ground in oil | lbs | 1800 |
| Raw linseed oil | gals | 250 |
| Turpentine | gals | 285 |
| Japan drier | gals | 15 |

Any of the present alkali metal glycol monoborates when incorporated in such a paint formulation in amounts of from about 0.5 to about 10% by weight will impart flame resistance to the paint.

(2) Oil Base Paint

| | | |
|---|---|---|
| Titanium dioxide | lbs | 75 |
| Zinc oxide | lbs | 270 |
| White lead | lbs | 75 |
| Asbestine | lbs | 170 |
| Refined linseed oil | gals | 100 |
| Boiled linseed oil | gals | 50 |
| Drier (6% cobalt naphthenate) | gals | 10 |
| Turpentine | gals | 50 |

Any of the present alkali metal glycol monoborates when incorporated in such a paint formulation in amounts of from about 0.5 to about 10% by weight will impart flame resistance to the paint.

(3) Varnish

| | | |
|---|---|---|
| Water-white rosin | lbs | 40 |
| Manila gum | lbs | 160 |
| Sodium hydroxide | lbs | 4 |
| Boiled linseed oil | gals | 140 |
| Turpentine | gals | 280 |
| Naphtha | gals | 420 |

Any of the present alkali metal glycol monoborates when incorporated in such a varnish formulation in amounts of from about 0.5 to about 10% by weight will impart flame resistance to the varnish.

(4) Varnish

| | | |
|---|---|---|
| Water-white rosin | lbs | 100 |
| Calcium hydroxide | lbs | 5 |
| Litharge | lbs | 7 |
| Red lead | lbs | 2 |
| China-wood oil | gals | 200 |
| Raw linseed oil | gals | 100 |
| Naphtha | gals | 600 |
| Japan drier | gals | 30 |

Any of the present alkali metal glycol monoborates when incorporated in such a varnish formulation in amounts of from about 0.5 to about 10% by weight will impart flame resistance to the varnish.

(5) Lacquer

| | | |
|---|---|---|
| Nitrocellulose | lbs | 120 |
| Ester gum | lbs | 70 |
| Blown linseed oil | gals | 65 |
| Tricresyl phosphate | lbs | 20 |
| Amyl acetate | gals | 230 |
| Butanol | gals | 190 |
| Toluene | gals | 300 |
| Xylene | gals | 30 |

Any of the present alkali metal glycol monoborates when incorporated in such a lacquer formulation in amounts of from about 0.5 to about 10% by weight will impart flame resistance to the lacquer.

Samples of fiberboard painted with the paint of Example 2 containing 10% by weight of sodium hexylene glycol monoborate showed remarkable flame resistance over fiberboard painted with the same paint but containing none of the present flame retardant additive. The flame extinguished spontaneously on the fiberboard coated with the paint containing the above flame retardant additive, while the control samples were completely consumed by fire.

Other modes of applying the principle of the invention may be employed provided the features stated in any of the following claims or the equivalent of such be employed.

We, therefore, particularly point out and claim as our invention:

1. A composition of matter consisting essentially of an organic composition useful as a coating having an oil and organic solvent vehicle and from about 0.5 to about 10% by weight of said coating of a fire retardant, said fire retardant selected from the group consisting of the alkali metal salts of 1,2- and 1,3-glycol monoborates having the formula:

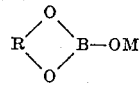

where R is an alkylene radical of 2 to 3 carbon atoms in length and having a total of from 2 to 10 carbon atoms, and M is an alkali metal.

2. A composition of matter consisting essentially of an oil base paint and from about 0.5 to about 10% by weight of said paint of a fire retardant, said fire retardant selected from the group consisting of the alkali metal salts of 1,2- and 1,3-glycol monoborates, having the formula:

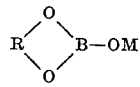

where R is an alkylene radical of 2 to 3 carbon atoms in length and having a total of from 2 to 10 carbon atoms, and M is an alkali metal.

3. A composition of matter consisting essentially of a lacquer and from about 0.5 to about 10% by weight of said lacquer of a fire retardant, said fire retardant selected from the group consisting of the alkali metal salts of 1,2- and 1,3-glycol monoborates having the formula:

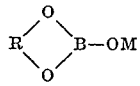

where R is an alkylene radical of 2 to 3 carbon atoms in length and having a total of from 2 to 10 carbon atoms, and M is an alkali metal.

4. A composition of matter consisting essentially of a varnish and from about 0.5 to about 10% by weight of said varnish of a fire retardant, said fire retardant selected from the group consisting of the alkali metal salts of 1,2- and 1,3-glycol monoborates having the formula

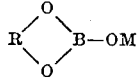

where R is an alkylene radical of 2 to 3 carbon atoms in length and having a total of from 2 to 10 carbon atoms, and M is an alkali metal.

5. The composition of claim 1 where said fire retardant is sodium hexylene glycol monoborate.

References Cited in the file of this patent

UNITED STATES PATENTS

| | | |
|---|---|---|
| 2,523,626 | Jones et al. | Sept. 26, 1950 |
| 2,542,721 | Stafford | Feb. 20, 1951 |